United States Patent
Mores et al.

(10) Patent No.: US 11,693,429 B2
(45) Date of Patent: Jul. 4, 2023

(54) MULTI-ROTOR AIRCRAFT AND METHOD OF CONTROLLING SAME

(71) Applicant: Volocopter GmbH, Bruchsal (DE)

(72) Inventors: Sebastian Mores, Munich (DE); Krishna Rajput, Munich (DE)

(73) Assignee: Volocopter GmbH, Bruchsal (DE)

( * ) Notice: Subject to any disclaimer, the term of this patent is extended or adjusted under 35 U.S.C. 154(b) by 159 days.

(21) Appl. No.: 17/245,247

(22) Filed: Apr. 30, 2021

(65) Prior Publication Data

US 2021/0365048 A1 Nov. 25, 2021

(30) Foreign Application Priority Data

May 19, 2020 (EP) .................................... 20175379

(51) Int. Cl.
*G05D 1/08* (2006.01)
*B64C 27/32* (2006.01)
(Continued)

(52) U.S. Cl.
CPC ........... *G05D 1/0816* (2013.01); *B64C 27/32* (2013.01); *B64C 29/0025* (2013.01); *G05D 1/0858* (2013.01); *G05D 1/102* (2013.01)

(58) Field of Classification Search
CPC .... G05D 1/0816; G05D 1/0858; G05D 1/102; B64C 27/32; B64C 29/0025
See application file for complete search history.

(56) References Cited

U.S. PATENT DOCUMENTS

2006/0151666 A1* 7/2006 VanderMey ........ B64C 29/0016
244/12.3
2018/0065737 A1 3/2018 Kroo
(Continued)

FOREIGN PATENT DOCUMENTS

EP 3176084 6/2017
EP 3176084 A1 * 6/2017 ............. B64C 27/08
(Continued)

OTHER PUBLICATIONS

English translation of RU-2527248-C1.*
(Continued)

*Primary Examiner* — Anshul Sood
*Assistant Examiner* — Matthew Ho
(74) *Attorney, Agent, or Firm* — Volpe Koenig, P.C.

(57) ABSTRACT

A method of controlling a multi-rotor aircraft (1) including at least five, preferably at least six, lifting rotors (2; R1-R6), each having a first rotation axis which is essentially parallel to a yaw axis (z) of the aircraft (1), and at least one forward propulsion device (3), preferably two forward propulsion devices (P1, P2), the at least one forward propulsion device having at least two rotors (P1_R1, P1_R2, P2_R1, P2_R2) that are arranged coaxially with a second rotation axis which is essentially parallel to a roll axis (x) of the aircraft. The at least one or each of the forward propulsion devices (3, P1, P2) being arranged at a respective distance (+y, −y) from said roll axis (x). The method further includes: using at least one of the rotors of the at least one forward propulsion device to control the aircraft's moment about the yaw and/or roll axes independently from each other.

20 Claims, 10 Drawing Sheets

(51) Int. Cl.
 *B64C 29/00* (2006.01)
 *G05D 1/10* (2006.01)

(56) References Cited

U.S. PATENT DOCUMENTS

2018/0105268 A1   4/2018  Tighe et al.
2020/0140079 A1*  5/2020  Campbell ............. B64C 39/024
2021/0323659 A1* 10/2021  Zhang ..................... B64C 27/26

FOREIGN PATENT DOCUMENTS

| GB | 2555439 | | 5/2018 |
| JP | H11278389 A | * | 10/1999 |
| RU | 2527248 C1 | * | 8/2014 |
| RU | 2629478 C2 | * | 8/2017 |

OTHER PUBLICATIONS

English translation of EP-3176084-A1.*
English translation of RU-2629478-C2.*
English translation of JP H11278389 A.*

* cited by examiner

| Situation | | P1_R1 | P1_R2 | P2_R1 | P2_R2 | Total |
|---|---|---|---|---|---|---|
| Unbalanced yaw about positive z-axis | Fx | 0 | 0 | -P2_R1<sub>Fx</sub> | -P2_R2<sub>Fx</sub> = -P2_R1<sub>Fx</sub> | -2*P2_R1<sub>Fx</sub> |
| | Mx | 0 | 0 | +P2_R1<sub>Mx</sub> | -P2_R2<sub>Mx</sub> = +P2_R1<sub>Mx</sub> | 0 |
| | Mz | 0 | 0 | -P2_R1<sub>Fx</sub> * +y | -P2_R2<sub>Fx</sub> * +y | -2*P2_R1<sub>Fx</sub> * y |
| Unbalanced yaw about negative z-axis | Fx | -P1_R1<sub>Fx</sub> | -P1_R2<sub>Fx</sub> = -P1_R1<sub>Fx</sub> | 0 | 0 | -2*P1_R1<sub>Fx</sub> |
| | Mx | +P1_R1<sub>Mx</sub> | -P1_R2<sub>Mx</sub> = +P1_R1<sub>Mx</sub> | 0 | 0 | 0 |
| | Mz | -P1_R1<sub>Fx</sub> * -y | -P1_R2<sub>Fx</sub> * -y | 0 | 0 | +2*P1_R1<sub>Fx</sub> * y |

Fig. 4

| Situation | | P1_R1 | P1_R2 | P2_R1 | P2_R2 | Total |
|---|---|---|---|---|---|---|
| Unbalanced roll about positive x-axis | Fx | 0 | -P1_R2Fx | 0 | -P2_R2Fx = -P1_R2Fx | -2*P1_R2Fx |
| | Mx | 0 | -P1_R2Mx | 0 | -P2_R2Mx = -P1_R2Mx | -2*P1_R2Mx |
| | Mz | 0 | -P1_R2Fx * -y | -P2_R1Fx = -P1_R1Fx | -P2_R2Fx * y | 0 |
| Unbalanced roll about negative x-axis | Fx | -P1_R1Fx | 0 | -P2_R1Fx = -P1_R1Fx | 0 | -2*P1_R1Fx |
| | Mx | +P1_R1Mx | 0 | +P2_R1Mx = +P1_R1Mx | 0 | +2*P1_R1Mx |
| | Mz | -P1_R1Fx * -y | 0 | -P2_R1Fx * +y | 0 | 0 |

Fig. 6

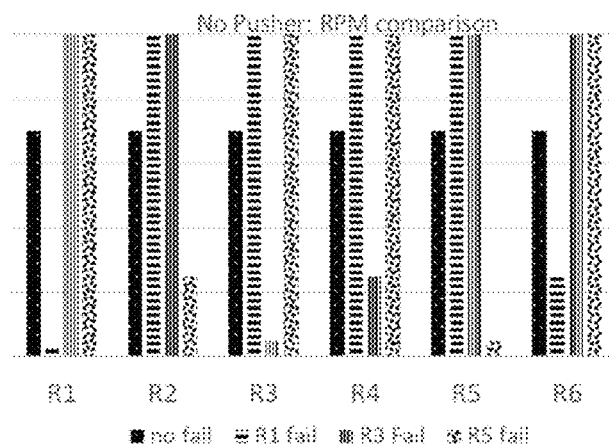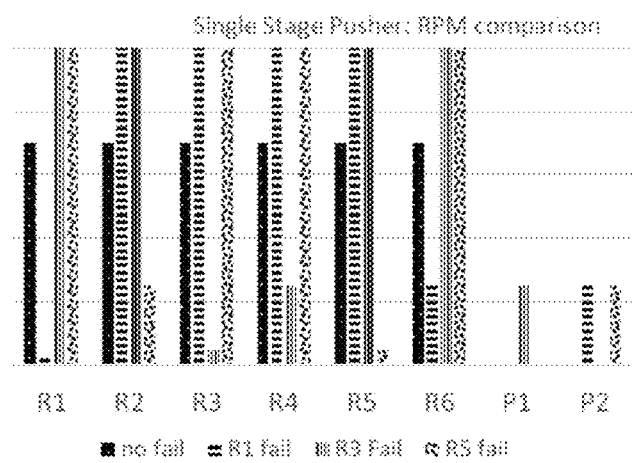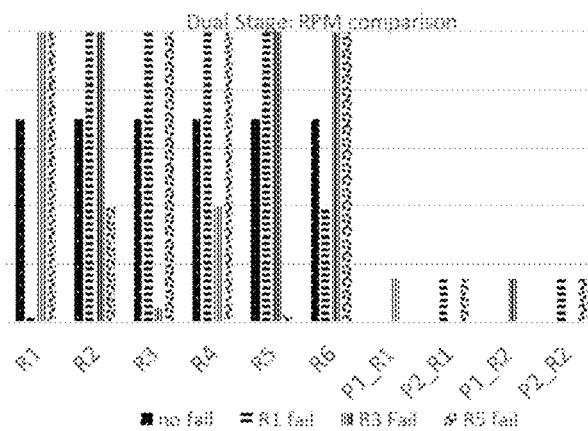
Fig. 9 ary motion of the aircraft which has to be sustained. Also, during forward flight, the aircraft will fly in circles without proper yaw control (hence rotate about its yaw axis).

MULTI-ROTOR AIRCRAFT AND METHOD OF CONTROLLING SAME

INCORPORATION BY REFERENCE

The following documents are incorporated herein by reference as if fully set forth: European Patent Application No. 20 175 379.5, filed May 19, 2020.

TECHNICAL FIELD

The invention relates to a method of controlling a multi-rotor aircraft.

The invention also relates to a multi-rotor aircraft.

BACKGROUND

Multi-rotor aircraft generally use lifting rotors (or, even more generally speaking, so-called effectors, e.g., propellers, fans, cross-flow fans, rotors, jets, etc.) for lifting the aircraft. In the case of an aircraft with four such effectors, the aircraft may become uncontrollable in case of loss of one effector. Even with more than three effectors left, an aircraft can become uncontrollable or has reduced controllability due to additional forces acting upon the aircraft (e.g., wind, turbulence, manoeuvre loads, etc.), which may lead to power demands for the remaining effectors that are above the engines' design limits. For instance, in case the aircraft has six effectors, the loss of one effector will lead to the necessity to reduce the thrust on the oppositely located effector in order to sustain airworthiness due to the balancing of moments and thrust. In that case, the remaining effectors may experience high power demands up to 100% over-power. This requires heavy duty effector design, which is disadvantageous in terms of cost and weight.

In case of an aircraft having, e.g., six effectors, the loss of one effector will lead to an unbalanced momentum situation which thus leads to an uncontrolled motion of the aircraft. Since aircraft balancing is not a static case, this will lead to a dynamic motion in order to re-balance the aircraft, especially at low speed or hovering conditions. This again will lead to higher peak power demands for each motor unit (effector). This shall be explained in more detail below.

An aircraft with a hexacopter configuration (i.e., without any forward pushing devices) has drawbacks when one lifting propeller of the total of six fails or is strongly limited in operation. This may happen in the case of an accident, propeller burst, foreign object damage, intentional shut-off due to a system warning, etc. In that case, the opposite located lifting propeller will usually be shut-off or reduced in rotational speed to a minimum, since it would produce too much thrust on the opposite aircraft side. This means that the remaining four propellers need to increase their thrust to a very high level in order to hold the aircraft's weight, which leads to very high power levels of the respective motors. As already stated above, this entails an adapted motor design, leading to very high weights.

Additionally, possible yawing motion of the aircraft is significantly limited due to the missing of almost two out of six lifting propellers. Furthermore, yaw control might be different between the left and right directions depending on the position of the failed lifting propeller. This is due to the fact that rotational speed (hence the torque) varies along the remaining lifting propellers together with a respective lever arm between a given propeller and the aircraft rotation axis.

The same effect arises during a sudden stop of a propeller during forward flight, which will lead to an uncontrolled yawing motion of the aircraft which has to be sustained. Also, during forward flight, the aircraft will fly in circles without proper yaw control (hence rotate about its yaw axis).

Losing one propeller out of six will lead generally to an unfavourable yawing motion, high power demands on the remaining motors, and roll motion. However, the present application is not limited to aircraft with six rotors and to cases of failure of lifting rotors.

In general fashion, the loss of one out of six effectors will lead to an uncontrolled yaw motion, i.e., motion around a yaw axis (vertical or z-axis) of the aircraft. EP 3 176 084 A1 discloses a method for improving the flight characteristics of a multicopter in a failure situation, comprising providing a multicopter with at least six rotors each having a defined target rotational direction, and driving the rotors such that they rotate according to their respective desired rotational direction, wherein in the failure situation at least one of the remaining rotors is controlled such that it at least temporarily rotates counter to its desired direction of rotation in order to compensate the failure.

This entails high power demands for the remaining effectors and also leads to a high torque demand. This is the main weight driver for any electrical engine and will lead to an increased weight of the aircraft as such.

In the case of a failure of one propeller on a multicopter, an additional force in lateral direction has to be created in another way. This is commonly done by pre-inclining the propellers in order to create an additional lateral force vector. Yet this technique, which is not only applied in view of potential failure case scenarios, reduces the overall efficiency of the aircraft during hover condition because a portion of the thrust is not utilized for lifting the aircraft (force/thrust in z-direction).

US 2006/151666 A1 discloses an aircraft with several lifting units and several pushing units (i.e., additional forward propulsion devices) which are placed in outward positions in lateral (y-axis) and vertical (z-axis) direction. Due to this configuration, the forward propulsion devices can generate a pitching moment/motion due to a respective propulsive force multiplied by the distance in z-direction. Same holds for the yaw moment/motion due to the propulsive force multiplied by the distance in y-direction.

Generally, compensation of moments is achieved by altering the torque about the propeller axes. By doing so, the propulsive thrust is altered as well. Hence, thrust and moment about the propeller axes are always linked. Therefore, this approach will lead to a thrust modulation and to an unwanted yawing motion.

US 2018/105268 A1 generally discloses multiple lifting rotors and multiple, fixed pitch, single stage pushing propellers (i.e., forward propulsion devices) for a forward flight. Yaw control is achieved by altering the thrust of each pusher propeller, thereby also altering the torque about the propellers' axis. This leads to a roll moment of the aircraft at a reduced thrust force. Again, thrust and torque are not independent from each other.

The same holds for prior art documents US 2018/105268 A1 and US 2018/065737 A1.

SUMMARY

It is the object of the invention to provide a multi-rotor aircraft and a method of operating same which does not suffer from the above-described disadvantages and allows to control both thrust and torque while it does not introduce any unwanted motion about the aircraft's axes. Furthermore, disadvantages in terms of effector cost and weight shall be avoided.

This object is achieved by a method and an aircraft having one or more of the features described hereon. Advantageous further embodiments are defined below and in the claims.

According to a first aspect of the invention, a method of controlling a multi-rotor aircraft, said aircraft comprising at least four, preferably at least five, more preferably at least six, lifting rotors, each having a first rotation axis which is essentially parallel to a yaw axis (z) of the aircraft, and at least one forward propulsion device, preferably two forward propulsion devices, the at least one forward propulsion device or each of said forward propulsion devices having at least two rotors that are arranged coaxially with a second rotation axis which is essentially parallel to a roll axis (x) of the aircraft, the at least one forward propulsion device or each of said forward propulsion devices being arranged at a respective distance from said roll axis, comprises: using at least one of the rotors of the at least one forward propulsion device to control the aircraft's moment about the yaw axis and/or the roll axis independently from each other.

Said distance from the roll axis may include configurations in which the distance is zero, e.g., only one centered forward propulsion device. However, configurations with more than one forward propulsion device will usually have said forward propulsion devices being arranged at respective distances from said roll axis that are greater than zero.

According to a second aspect of the invention, a multi-rotor aircraft comprises: at least five, preferably at least six, lifting rotors, each having a first rotation axis which is essentially parallel to a yaw axis (z) of the aircraft; at least one forward propulsion device, preferably two forward propulsion devices, the at least one forward propulsion device or each of said forward propulsion devices having at least two rotors that are arranged coaxially with a second rotation axis which is essentially parallel to a roll axis (x) of the aircraft, the at least one forward propulsion device or each of said forward propulsion devices being arranged at a respective distance from said roll axis; a flight control unit in operative connection with said lifting rotors and said at least one forward propulsion device, which flight control unit is adapted to control said lifting rotors and said at least one forward propulsion device to compensate any unbalanced moment around the yaw axis or the roll axis, in particular in the case of failure of any one of the lifting rotors, by: controlling at least one of the rotors of the at least one forward propulsion device to control the aircraft's moment about the yaw axis and/or the roll axis independently from each other.

In this way, the invention provides an airworthy aircraft with low overpower usage in case of the loss of one effector (lifting rotor), but not limited to such event. This is achieved by providing the aircraft with at least two additional degrees of freedom (momentum and thrust) by including at least one essentially longitudinal thrust effector (forward propulsion device) which can adjust thrust and torque essentially independently due to its coaxial rotors. It can be operated to provide a) thrust with no residual torque acting upon the aircraft; b) thrust with controlled residual torque acting upon the aircraft; c) torque with no additional necessary longitudinal (forward) thrust; d) torque and additional necessary longitudinal thrust; and e) thrust reversal with or without residual torque acting upon the aircraft.

Preferably, the effectors (rotors) are electrically driven by means of suitable electric motors.

The invention includes adding at least one, preferably two, essentially longitudinally active thrust effectors in order to control the aircraft's yaw motion. This can be done, for instance, by providing differential thrust between said two longitudinal thrust effectors.

The thrust effectors may also be used to provide torque at least in one, preferably two, essentially longitudinal directions in order to control the aircraft's roll motion. By having, in a further embodiment of the invention, two torque directions per effector (i.e., coaxial rotors with opposite rotation directions) one can control the resulting torque of the effector by using differential torque (hence differential RPM—rotations per minute). This can be done with or without changing an overall thrust of the effector.

If there is at least one, preferably at least two lateral thrust effectors that is/are located at a distance from the longitudinal axis (roll axis) and is/are able to provide additional (differential) thrust, yet without increasing the torque about the longitudinal axis (roll axis), the yaw motion is decoupled from the roll motion. For an odd number of such lateral thrust effectors, the torque about the longitudinal axis (roll axis) can be kept constant if at least one of the lateral thrust effectors has coaxially arranged rotors that rotate in different directions.

In an embodiment, yaw control can be made more effective by using longitudinal effectors, i.e., at least two such longitudinal effectors producing thrust in opposite directions without any additional force in the longitudinal direction.

In an embodiment, by adjusting a direction of thrust of the longitudinal thrust effectors, pitch motion of the aircraft can be influenced/controlled.

The following paragraphs describe various advantageous embodiments of the present invention in comparison to the prior art:

More specifically, an embodiment of the invention describes a multi-rotor aircraft which can take-off and land vertically and fly forward with the use of wings and forward thrust producing units (forward propulsion devices). In an embodiment of the invention, a hexacopter is described, which has six lifting rotors (R1 to R6, see below) and two pushing units (forward propulsion devices; P1 and P2, see below) for forward flight acceleration. Each pushing unit or pusher comprises more than one rotor which rotate in opposite directions in order to improve the pushers' efficiency and to reduce its size compared to an open rotor design. By using multiple rotors in one pusher, similar to the common aviation turbines, one can provide more thrust on a limited diameter of a fan. The coaxial layout of the pushing units has the additional benefit to control the torque about the longitudinal axis (x-direction) produced by the pushing unit since the internal rotors rotate coaxially. The additional torque is one additional degree of freedom which can be utilized by the aircraft's flight control computer (flight control unit) in order to optimize the aircraft's flight attitude since it acts in addition to the overall momentum of the overall aircraft as such. This additionally produced longitudinal torque is primarily acting upon the roll axis (x-direction), hence it contributes to the aircraft's roll-motion or can be used to counter any unwanted roll-motion.

Since the pushing units provide additional thrust and—by design—are placed with lateral offset from the vertical plane of symmetry (x-z-plane), this thrust produces an additional moment about the vertical z-axis or yaw axis.

Typically, conventional propeller aircraft do only have only one staged propeller on each side of the aircraft, which have only one dedicated rotational direction which means that the longitudinal torque (roll moment) is applied only in one direction. The thrust produced by said propellers can be used to control the aircraft's yawing motion (z-axis), yet at the same time alters the longitudinal torque (x-axis). In the context of the present invention, the roll and yaw moments can be altered independently due to the presence of an additional rotor stage in the at least one pushing unit, which provides torque in the opposite direction. This entails that any unbalanced forces and moments of an aircraft can be balanced with less power demand on the motors of the lifting rotors.

In an embodiment, the method further comprises determining an unbalanced moment about the yaw and/or the roll axis; using at least one of the rotors of the at least one forward propulsion device to compensate said unbalanced moment around the yaw axis or the roll axis, in particular in the case of failure of any one of the lifting rotors.

In an embodiment, the method further comprises, in the case of failure of any one of the lifting rotors, operating all of the remaining, functional lifting rotors with adapted respective rotor speeds, preferably as compared to nominal operation without unbalanced moments. In this way, the newly gained freedom of control, which is based on coaxially rotating pusher rotors (or propellers) may be utilized (by flight control) only in an emergency condition, e.g., degradation or complete failure of one lifting propulsion unit (lifting propeller). Since all of the remaining lifting rotors are used, the overpower demand can be reduced.

In an embodiment, the method further comprises, in the case of an unbalanced moment about the yaw axis, operating both rotors of the at least one forward propulsion device or of multiple forward propulsion devices in mutually opposite directions of rotation to generate, with said both rotors, a combined thrust force in a direction parallel to the roll axis for a given forward propulsion device, wherein a moment about the yaw axis created by said combined thrust force is essentially equal in magnitude but opposite in direction to the determined unbalanced moment about the yaw axis.

In an embodiment of the method said combined thrust force for one forward propulsion device is opposite in direction when compared to the combined thrust force of another forward propulsion device, and a combined moment about the yaw axis created by said combined thrust forces is essentially equal in magnitude but opposite in direction to the determined unbalanced moment about the yaw axis. This allows compensation of the determined unbalanced moment about the yaw axis.

In an embodiment of the method, in the case of two forward propulsion devices that are located at a same distance from the roll axis, the combined thrust forces of the forward propulsion devices are equal in magnitude. This is an efficient way of compensation of the determined unbalanced moment about the yaw axis.

In an embodiment, the method further comprises, in the case of an unbalanced moment about the roll axis, operating at least one of the rotors of the at least one forward propulsion device, preferably at least one of the rotors of each forward propulsion device, preferably only one rotor of each forward propulsion device, wherein a combined moment about the roll axis generated by said operated rotor(s) of the forward propulsion device(s) is essentially equal in magnitude but opposite in direction to the determined unbalanced moment about the roll axis. This enables compensation of said determined unbalanced moment about the roll axis.

In an embodiment, the method further comprises, in the case of an unbalanced moment about the yaw axis, generating, for each forward propulsion device in a multitude of forward propulsion devices, a respective moment about the yaw axis, which moments are of essentially equal magnitude but of opposite direction.

In an embodiment, the method further comprises, in the case of an unbalanced moment about the yaw axis: i) for each forward propulsion device, the rotors are operated such that they do not produce, in combination, any moment about the roll axis; or ii) in the forward propulsion devices, the rotors are operated such that any moments about the roll axis created by the forward propulsion devices are compensated between the forward propulsion devices.

In an embodiment of the method, in the case of an unbalanced moment about the roll axis, when operating only one rotor per forward propulsion device from a multitude of two forward propulsion devices (i.e., at least two such devices), a direction of rotation is the same for the rotors of both forward propulsion devices.

In an embodiment of the method, in the case of an unbalanced moment about the roll axis, when operating both rotors for a given forward propulsion device, said both rotors are operated in differential mode, thus producing a residual moment about the roll axis.

In an embodiment of the method, in the case of an unbalanced moment about the roll axis, at least one rotor of each forward propulsion device from a multitude of two forward propulsion devices (i.e., at least two such devices) is operated to generate, with each forward propulsion device, a thrust force of each forward propulsion device in a direction parallel to the roll axis, wherein said thrust force of one forward propulsion device is oriented in a same direction when compared to the thrust force of the other forward propulsion device.

In an embodiment of the method said thrust force of one forward propulsion device is equal in magnitude when compared to the thrust force of the other forward propulsion device.

In an embodiment of the aircraft according to the invention the flight control unit is further adapted to perform the method according to an embodiment thereof.

In an embodiment of the aircraft according to the invention the forward propulsion devices from a multitude of two forward propulsion devices are located at equal distances (+y, −y) from said roll axis. This concept may be extended to any even number of forward propulsion devices.

In another embodiment of the aircraft according to the invention there could be an odd number, e.g. three, of lateral propulsion devices, two with equal distances (+y, −y) from roll axis and one aligned within the roll axis (i.e., centered).

In an embodiment of the aircraft according to the invention the rotors of the at least one forward propulsion device are devised for rotation in mutually opposite directions. Preferably, said direction may be changed (reversed).

In an embodiment of the aircraft according to the invention, in the case of six lifting rotors, the lifting rotors are arranged in pairs in symmetrical fashion with respect to the roll axis.

In an embodiment of the aircraft according to the invention the at least one forward propulsion device is located aft of and/or below the lifting rotors.

In an embodiment of the aircraft according to the invention the lifting rotors are devised identically and/or are located in line on respective opposite sides of the aircraft.

BRIEF DESCRIPTION OF THE DRAWINGS

Further features and advantages of the invention will now be described with reference to exemplary embodiments as shown in the appended drawings.

FIG. 4 shows a table with measures how to balance a yaw moment in the aircraft of FIG. 2;

FIG. 6 shows a table with measures how to balance a roll moment in the aircraft of FIG. 2;

FIG. 9 shows a comparison of RPM values for different aircraft; and

DETAILED DESCRIPTION

Figure 1:
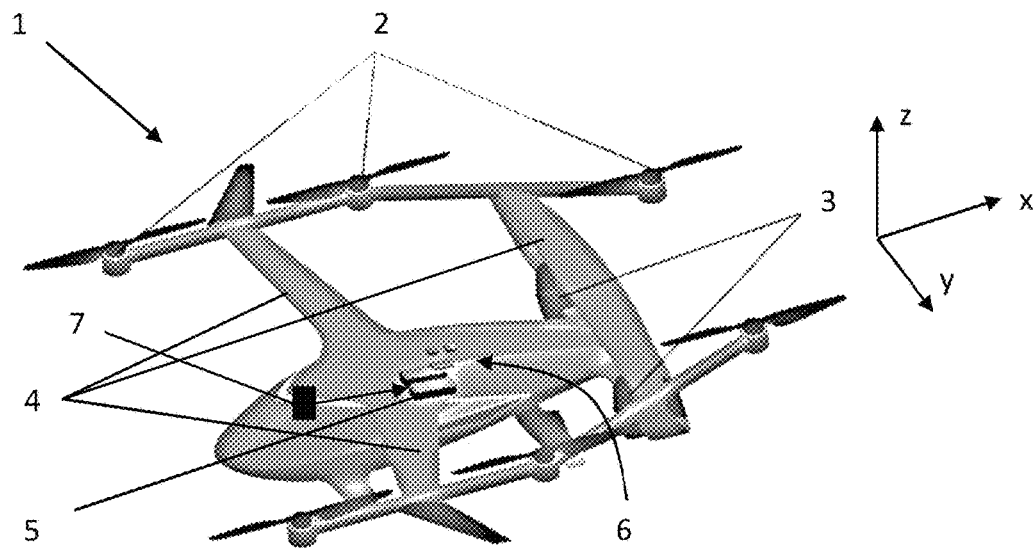
FIG. 1 shows a multi-rotor aircraft with lifters (lifting propellers) and pushers (pushing units)

FIG. 1 shows an aircraft 1 that can be operated using at least two different control options or control modes. The aircraft has lifters (lifting propellers) 2, i.e., rotors with essentially vertical axis of rotation, and pushers (pushing units) 3, i.e., rotors with essentially horizontal axis of rotation, as well as respective associated motors (not shown) for driving said rotors. While lifters 2 are used for, e.g., hover flight, pushers 3 can be used for forward travel which exceeds a certain threshold velocity. In this way, operating the aircraft 1 by using lifters 2 and by using pushers 3 (together with control surfaces, e.g., flaps, ailerons, elevators, etc.—some of them being denoted by reference numeral 4), respectively, can be regarded as two separated control options or modes. Using lifters 2 only can be regarded as a copter mode, whereas additionally using pushers 3 can be regarded as a jet mode. Reference numeral 5 denotes a flight controller or flight control unit/device in operational connection with different sensors 6, which sensors measure different physical parameters of the aircraft 1, in particular its airspeed (velocity relative to the ambient air) or any existing moments (roll, pitch, and yaw; axes x, y, and z, respectively). If the sensors 6 detect any unbalanced moment, as explained in detail above, flight controller 5 may use this information to operate the aircraft 1 in accordance with the present invention in order to balance said moments. Flight controller 5 uses different control laws to control, inter alia, lifters 2 and/or pushers 3 based on data provided by sensors 6 and pilot input (from pilot input device 7, e.g., a joystick) or data from an autonomous system which replaces the pilot. To this end, flight controller 5 uses a control algorithm that implements, inter alia, the method in accordance with the present invention.

In the aircraft 1 according to FIG. 1, the lifting rotors 2 are arranged in pairs in symmetrical fashion with respect to the roll axis (x axis). The pushers 3 are located aft of and/or below the lifting rotors 2. Further, the lifting rotors 2 are devised identically and/or are located in line on respective opposite sides of the aircraft 1.

Figure 2:
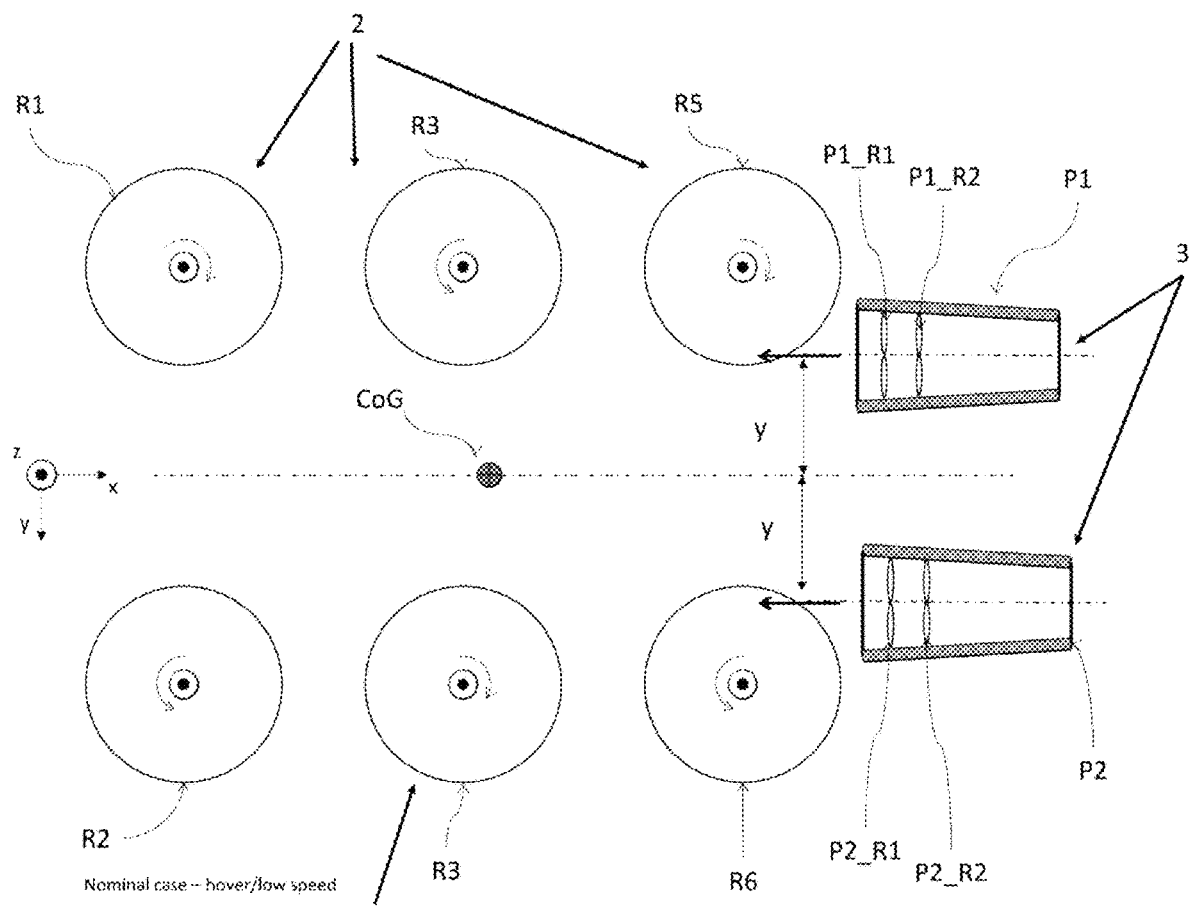
FIG. 2 shows the basic function of an aircraft 1 according to FIG. 1.

FIG. 2 shows the basic function of an aircraft 1 according to FIG. 1 with six lifting propellers 2 (denoted R1-R6) rotating about their respective axis (which essentially corresponds to the z axis (yaw axis)), each generating torque along/about said axis. However, the aircraft 1 generally is not limited to any particular type of lifter 2. Two pushing units 3 (denoted P1 and P2) are installed on each side of the rear of the aircraft 1 at a distance y from the roll axis (x axis) with the general purpose to produce thrust for a forward flight motion (along −x axis). Each pushing unit 3 has at least two internal rotors _R1, _R2, as described above, which are also hereinafter referred to as "stages". In this way, the pushing units 3 can be referred to as "dual stage" pushers. In order to control the aircraft 1, the following moments have to be controlled:

Roll—the motion about the longitudinal aircraft axis x, described as Mx;

Pitch—the motion about the lateral aircraft axis y, described as My;

Yaw—the motion about the vertical aircraft axis z, described as Mz.

The matrix below shows all forces and moments which act upon the aircraft 1 and which have to be balanced in order for it to be airworthy. As stated, R1 to R6 represent the lifters or lifting propellers 2, P1 and P2 represent the pushers or pusher units 3, whereas each pusher 3 has a rotor _R1 and a coaxially arranged counterrotating rotor _R2. Each of R1-R6, P1 and P2 produces three forces (Fx, Fy, Fz; the index refers to its direction in space) and three moments (Mx, My, Mz). Lifters R1, R3, and R5 are on the right-hand side of the aircraft 1, lifters R2, R4, and R6 are on the left-hand side of the aircraft 1. Pusher P1 is on the right-hand side, and pusher P2 on the left-hand side, as shown. Both pushers P1, P2 are located at a distance y (−/+y) from the aircraft's x axis. CoG denotes the aircraft's centre of gravity.

|    |          |          |          |          |          |          | P1            |               | P2            |               |
|----|----------|----------|----------|----------|----------|----------|---------------|---------------|---------------|---------------|
|    | R1       | R2       | R3       | R4       | R5       | R6       | Rotor1        | Rotor2        | Rotor1        | Rotor2        |
| Fx | $R1_{Fx}$ | $R2_{Fx}$ | $R3_{Fx}$ | $R4_{Fx}$ | $R5_{Fx}$ | $R6_{Fx}$ | $P1\_R1_{Fx}$ | $P1\_R2_{Fx}$ | $P2\_R1_{Fx}$ | $P2\_R2_{Fx}$ |
| Fy | $R1_{Fy}$ | $R2_{Fy}$ | $R3_{Fy}$ | $R4_{Fy}$ | $R5_{Fy}$ | $R6_{Fy}$ | $P1\_R1_{Fy}$ | $P1\_R2_{Fy}$ | $P2\_R1_{Fy}$ | $P2\_R2_{Fy}$ |
| Fz | $R1_{Fz}$ | $R2_{Fz}$ | $R3_{Fz}$ | $R4_{Fz}$ | $R5_{Fz}$ | $R6_{Fz}$ | $P1\_R1_{Fz}$ | $P1\_R2_{Fz}$ | $P2\_R1_{Fz}$ | $P2\_R2_{Fx}$ |
| Mx | $R1_{Mx}$ | $R2_{Mx}$ | $R3_{Mx}$ | $R4_{Mx}$ | $R5_{Mx}$ | $R6_{Mx}$ | $P1\_R1_{Mx}$ | $P1\_R2_{Mx}$ | $P2\_R1_{Mx}$ | $P2\_R2_{Mx}$ |
| My | $R1_{My}$ | $R2_{My}$ | $R3_{My}$ | $R4_{My}$ | $R5_{My}$ | $R6_{My}$ | $P1\_R1_{My}$ | $P1\_R2_{My}$ | $P2\_R1_{My}$ | $P2\_R2_{My}$ |
| Mz | $R1_{Mz}$ | $R2_{Mz}$ | $R3_{Mz}$ | $R4_{Mz}$ | $R5_{Mz}$ | $R6_{Mz}$ | $P1\_R1_{Mz}$ | $P1\_R2_{Mz}$ | $P2\_R1_{Mz}$ | $P2\_R2_{Mz}$ |

This correlation is also shown in FIG. 2 which illustrates a balanced aircraft 1 during hover or low velocity forward flight in nominal condition, hence with no rotor failure. The lifting propellers 2 all rotate essentially at the same speed, yet with different rotational directions (as shown by the respective arrows in FIG. 2), and thus produce essentially the same amount of torque each. This results in essentially no residual yawing moment about the aircrafts yaw axis (z axis).

Figure 3:
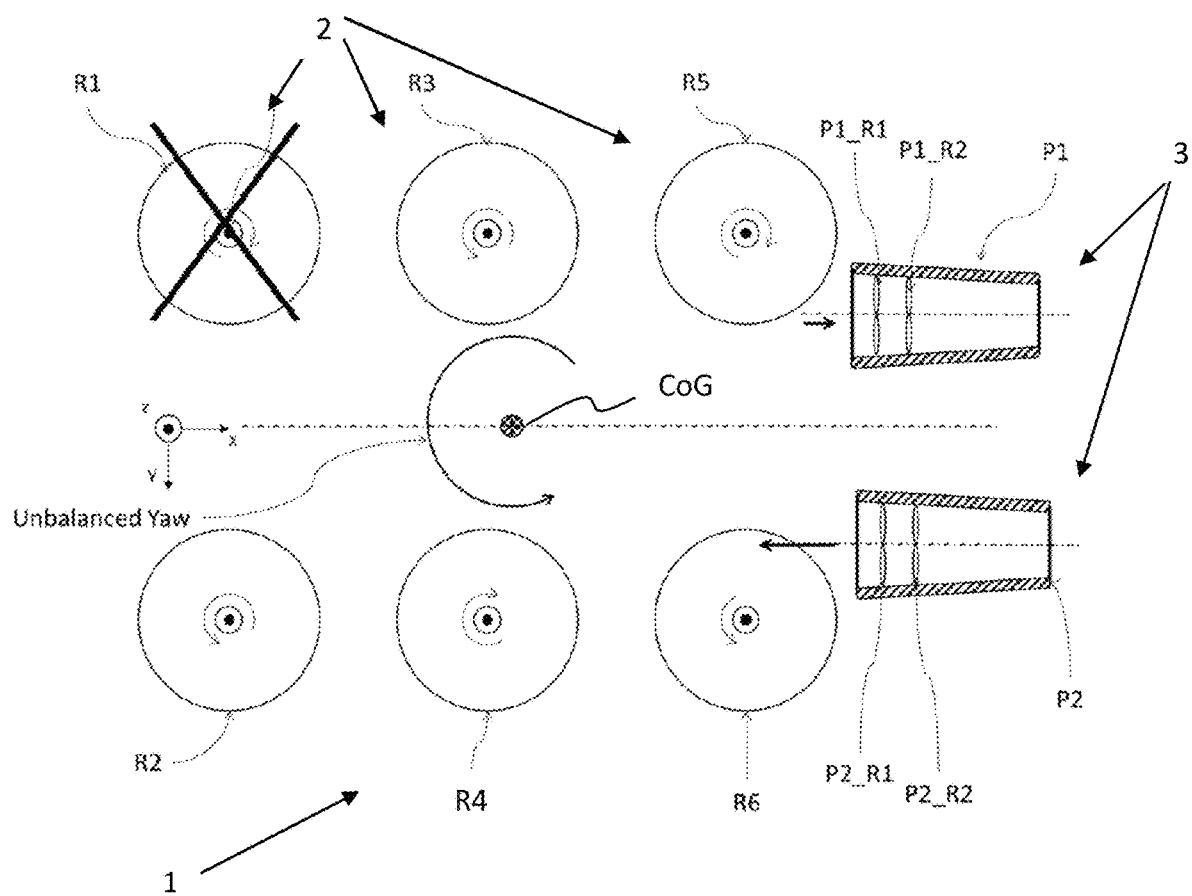
FIG. 3 shows the aircraft of FIG. 2 in the case of a failure of one lifting rotor.

In case of failure of one rotor, as example the front right rotor R1, as shown in FIG. 3, the remaining rotors R2-R6, have to compensate lift, pitch, roll and yaw. Typically, in the prior art, the opposite rotor (i.e., R6) is turned off in order to sustain the aircraft's controllability. The aircraft 1 has to balance its total weight on the remaining four rotors R2-R5, leading to a very high thrust level and therefore high RPM (rotations per minute), torque, energy consumption, and noise.

According to FIG. 3, it is proposed not to turn off but to use the opposite rotor R6 of the failed rotor R1, even though preferably at a reduced speed, in order to reduce the overpower needed by the remaining rotors R2-R6. This reduces the required weight and size of the motor design, but creates an unwanted yawing moment Mz ("unbalanced yaw", moment around yaw axis z). This moment is compensated by the pushing units 3 (P1, P2) which comprise at least two coaxial internal fan stages or internal rotors _R1, _R2 in order to create thrust and torque independently of each other.

Figure 2A:
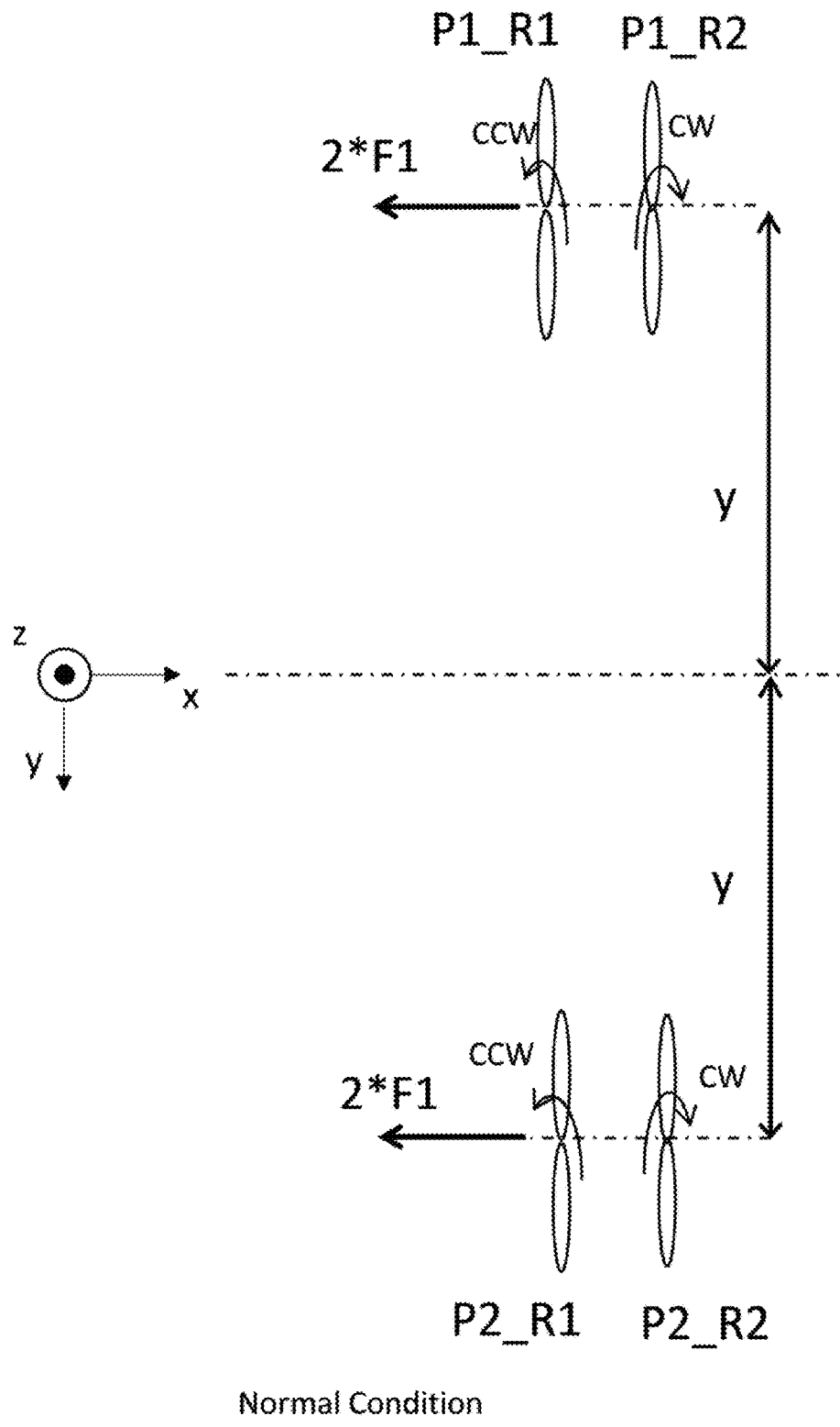
FIG. 2A shows normal operation of the pushing units in FIGS. 1 and 2.

For normal operational condition, cf. FIG. 2a, the pushers P1 and P2 with their internal Rotors _R1 and _R2 are operated as seen in the figure. "CW" denotes clockwise rotation, while "CCW" stands for counter-clockwise. The rotors of pusher P1 create a summed forward directed force 2*F1=P1_R1+P1_R2, similar to the pusher P2 which also creates a forward directed force 2*F1=P2_R1+P2_R2.

Preferably, the pushers P1, P2 (just like the lifters R1-R6, cf. FIG. 2) are electrically driven, so that the thrust can be reversed if needed. This may be used to create a thrust in the opposite direction. For the situation that the aircraft 1 (FIG. 1) has an unbalanced yaw moment about the positive z-axis, the pusher rotor P2_R1 (i.e., the rotor _R1 of pusher P2) may be operated to create a longitudinal force $-P2\_R1_{Fx}$ in the x-direction while the second stage P2_R2 of the same pusher, which rotates in opposite direction, creates a force of $-P2\_R2_{Fx}$ which equals $-P2\_R1_{Fx}$, thus yielding $Fx_{total}=-2*P2\_R1_{Fx}$.

Since the total longitudinal (roll) moment Mx thus created equals zero since the coaxial stages act opposite to each other ($Mx(P2\_R1)=+P2\_R1_{Mx}$ and $Mx(P2\_R2)=-P2\_R2_{Mx}$), the pushers do not create a roll moment. The total yawing moment Mz which is necessary to counterbalance the yawing motion of the aircraft 1 (cf. FIG. 1) is $Mz_{total}=-2*P2\_R1_{Fx}*y$. This is because the pusher propellers create the respective moments $Mz(P2\_R1)=-P2\_R1_{Fx}*(+y)$ and $Mz(P2\_R2)=-P2\_R2_{Fx}*(+y)$.

The exact opposite will be the case if the unbalanced yaw moment has to be produced about the negative z-axis. This is summarized in the table according to FIG. 4.

Figure 5:
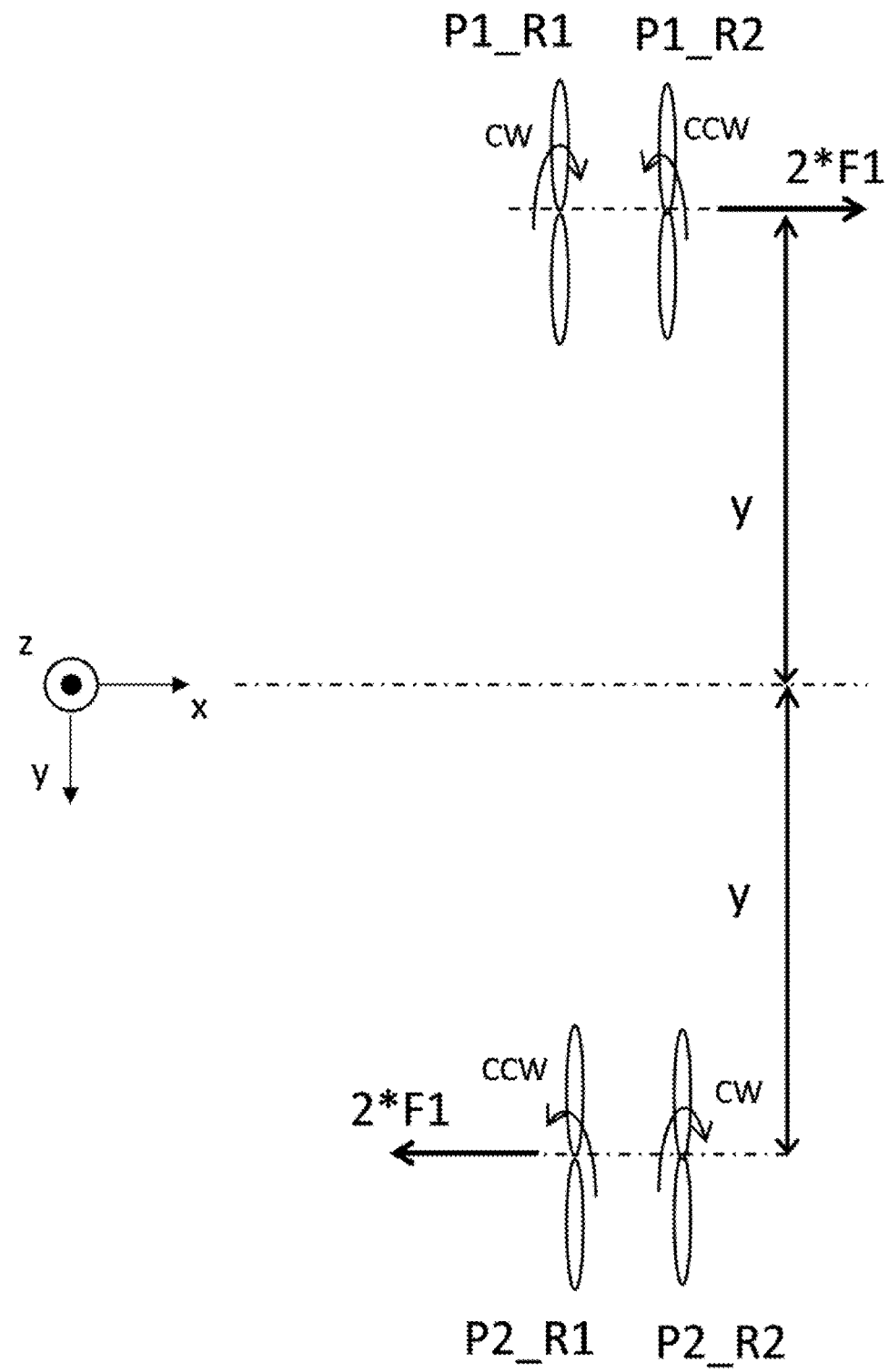
FIG. 5 shows a detail of the operation of the aircraft in FIG. 2 for balancing a yaw moment.

The unbalanced yawing moment can be compensated by having two opposing moments (yet without any additional roll-moment Mx and with a longitudinal force Fx as stated above). In the case of FIG. 5, these are $Mz(P1)=+2F1*(-y)$ of pusher P1 (top) and $Mz(P2)=-2F1*(+y)$ of pusher P2 (bottom), wherein F1 replaces $P1\_R1_{Fx}$ and $P1\_R2_{Fx}$ as well as $P2\_R1_{Fx}$ and $P2\_R2_{Fx}$. This yields as the resulting moment $Mz=-4F1*y$.

Figure 7:
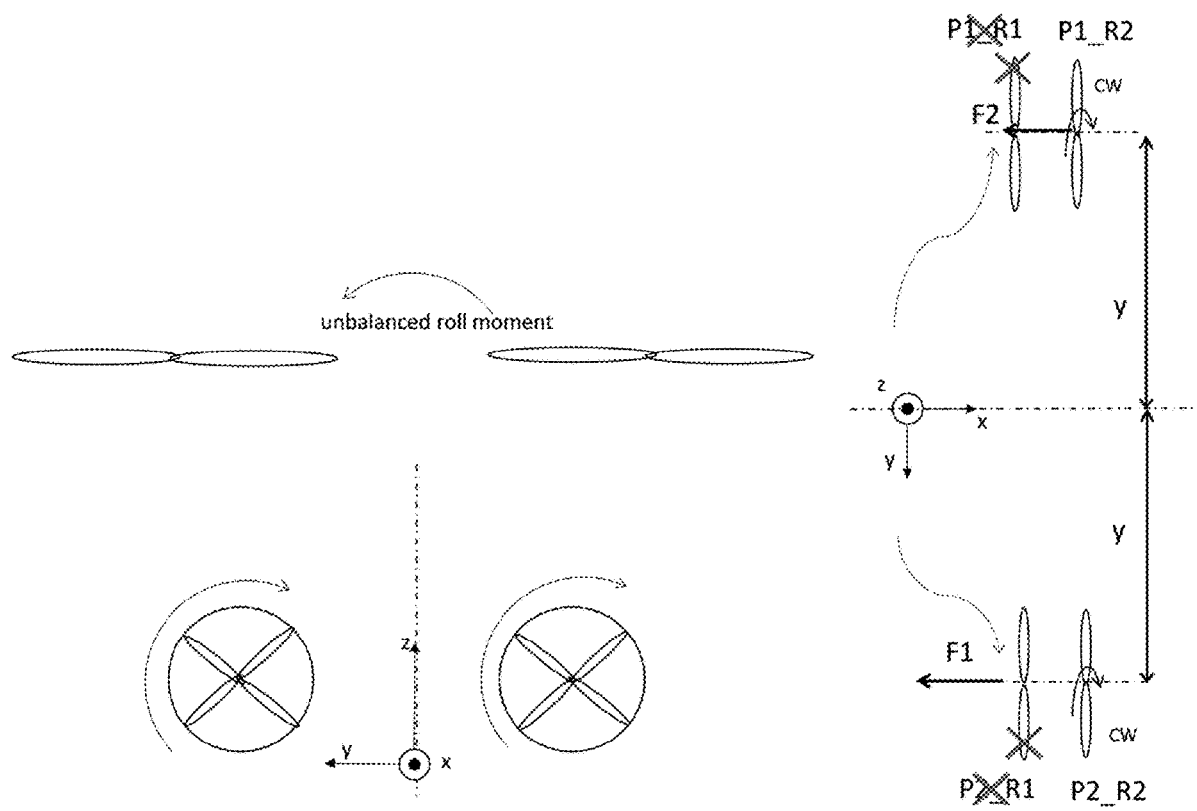
FIG. 7 shows operation of the aircraft in FIG. 2 for balancing a roll moment.

In case of an unbalanced roll moment about the positive x-axis (roll) of the aircraft the following can be done, cf. FIG. 7. Only the clockwise rotating rotor stages P1_R2 and P2_R2 are operated, which produce positive torque Mx. The longitudinal forces $Fx(P1\_R2)=-P1\_R2_{Fx}$ and $Fx(P2\_R2)=-P2\_R2_{Fx}=-P1\_R2_{Fx}$ add up to a total force of $Fx_{total}=-2*P1\_R2_{Fx}$, =F1+F2. The total moment about the roll axis equals $Mx_{total}=-2*P1\_R2_{Mx}$, and is the sum of $Mx(P1\_R2)=-P1\_R2_{Mx}$, and $Mx(P2\_R2)=-P2\_R2_{Mx}$, $=-P1\_R2_{Mx}$. The total yawing moment equals zero since the Mz of counterrotating propellers are directed oppositely.

The exact opposite will be the case if the unbalanced roll moment has to be produced about the negative x axis. This is summarized in the table according to FIG. 6.

Figure 8:
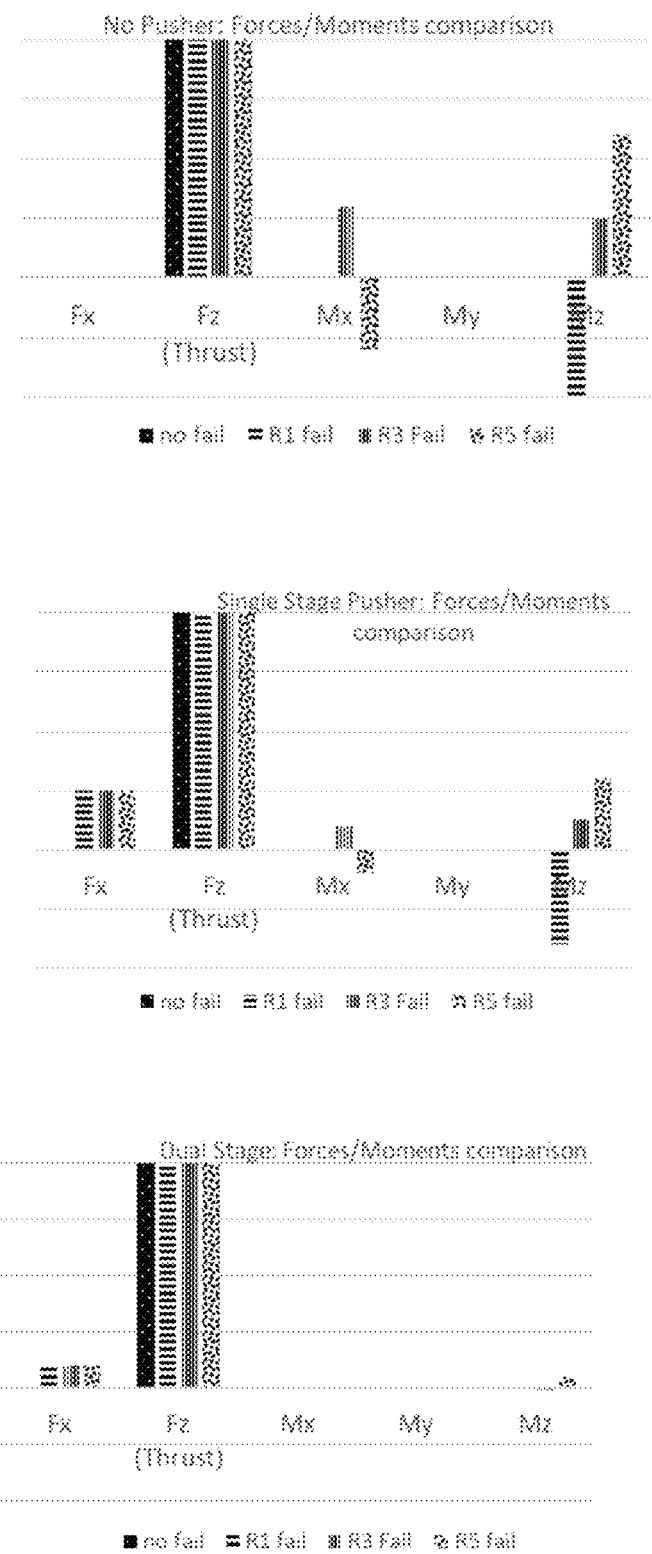
FIG. 8 shows a comparison of forces and moments for different aircraft.
Figure 10:
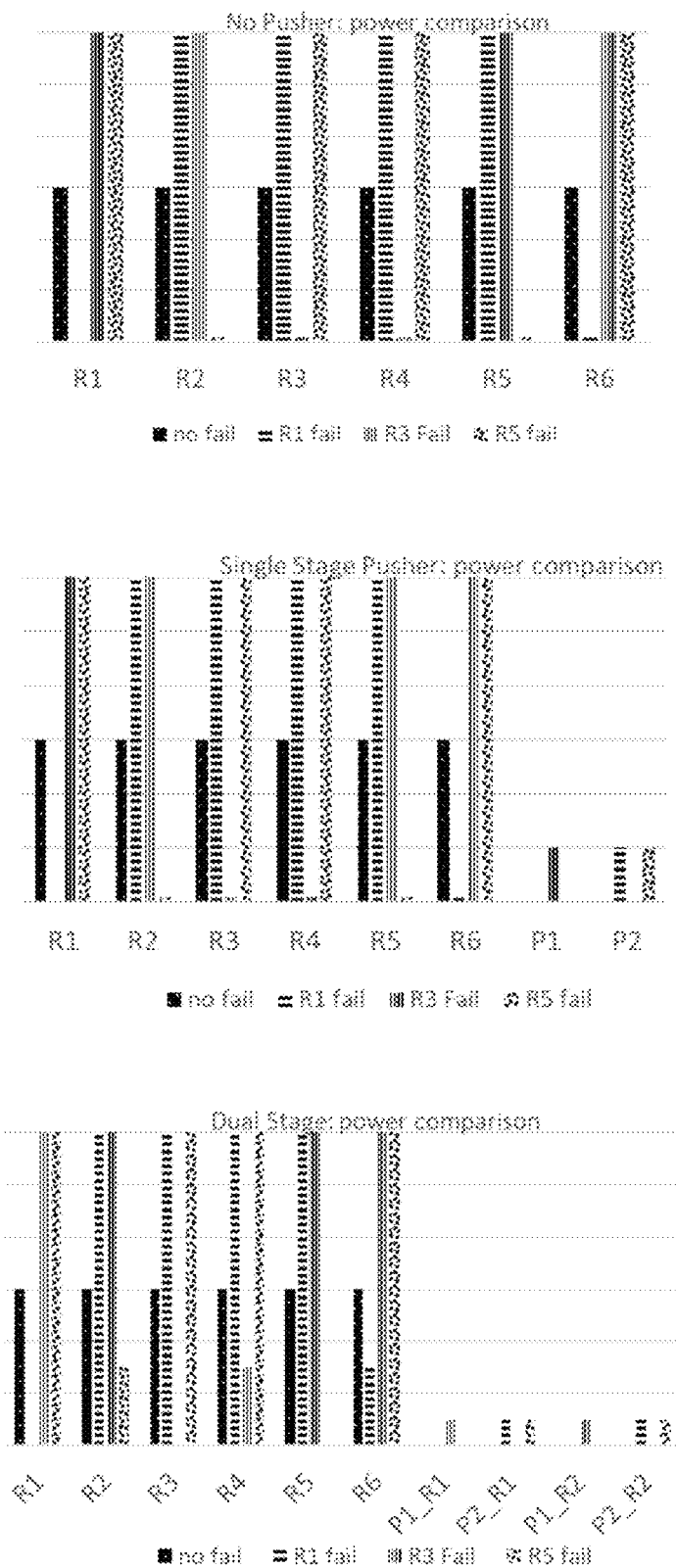
FIG. 10 shows a comparison of power consumptions for different aircraft.

FIGS. 8 to 10 each show comparisons of various values between the case of an aircraft with no pushers (conventional hexacopter; top), an aircraft with at least one single stage pusher (conventional hexacopter with two single stage pusher propellers as known from prior art; middle) and an aircraft according to the present invention (bottom) having at least one dual stage pusher, i.e., a forward propulsion device with at least two rotors that are arranged coaxially with a rotation axis that is essentially parallel to the roll axis (x) of the aircraft.

The three graphs in FIG. 8 show the comparison of longitudinal and vertical (lift) forces and the main moments Mx (Roll), My (Pitch), and Mz (Yaw) with all three variants at the same power/thrust level for simpler comparison. Depicted are four cases, i.e., no fail, fail of lifter R1, fail of lifter R3, and fail of lifter R5, respectively (cf. FIG. 2). The same holds for FIGS. 9 and 10.

It can be easily seen that at the same power level the invention (bottom) nicely levels out the unbalanced forces and moments in case of the failure of either lifter R1, lifter R3, or lifter R5. For the "no pusher" variant (top) the moments Mx and Mz are highly unbalanced, leading to a yaw and roll motion in hover, especially in forward flight. In this flight condition, the yaw motion is particularly uncontrollable, as stated in the above, which leads to a potential crash of the aircraft. In case two pushers are added with a single stage (middle), the moments Mx and Mz are somewhat reduced in comparison with the "no pusher" variant (top), but still limit the operation of the aircraft, hence creating an unwanted motion of the aircraft. The negative value of Mz shown in FIG. 8 (top, middle) is due to the rotation of the opposite lifter propeller (i.e. lifter R6, R4, R2, respectively), which creates a moment in the opposite direction.

The longitudinal force Fx, which leads to a forward motion of the aircraft, will appear in the middle and bottom cases since a balancing of moments will always lead to a forward directed Fx force. This is because in order to reduce the yawing moment Mz, a force Fx has to be generated which also leads to a higher rolling moment Mx. In contrast to this, in the dual stage variant (bottom), since the pusher propellers rotate coaxially and can be operated at significant lower RPM, they produce no or only minimal roll moment Mx while having the desired thrust to compensate Mz. This leads to an additional degree of freedom that the flight controller (cf. reference numeral 5 in FIG. 1) can use for aircraft stabilization.

The three graphs in FIG. 9 show a comparison of RPM values of the above-described balancing for the same cases as in FIG. 8. The variant without any pusher (top) has highly unbalanced roll and yaw moment in case of a rotor fail, which leads to a potential crash, since there is basically no balancing, or to a highly reduced controllability especially during forward flight. The single stage pusher variant (middle) tries to compensate the failure of one lifting propeller with its pusher, yet, as stated, unwanted residual forces will remain. The dual stage propeller (bottom) can reduce RPM significantly, leading to an enhanced control of the moment Mx independent of the thrust. Also shown is that an RPM value of the mentioned opposing propeller (e.g., R6 in case of failure or R1) is increased (for supporting the remaining lifters (R2 to R5) since the pusher can compensate the additional roll and yaw moments generated by the opposing lifting rotor R6. The same holds for lifters R4 and R2 in the case of failure of lifters R3 and R5, respectively.

The three graphs in FIG. 10 show a comparison of power consumption of the above-described balancing for the same cases as in FIG. 8. As mentioned above, the power levels of the three variants are set to an equal level in order to enable comparison. It can be gathered from FIG. 10 that if the variant with single stage pusher (middle) or without pusher (top) shall balance the aircraft forces, this will lead to significantly higher overall power demand which then leads to additional weight (through required heavier motors and/or additional battery capacity).

The above-described situations of failure of one lifting rotor are extreme conditions in which power consumption of the remaining rotors have to be reduced. However, reducing unbalanced yawing and rolling moments, as proposed by the invention, may also be used beneficial in nominal flight conditions with full operational lifting rotors. As the basic principle of the invention is to create an additional degree of freedom (DoF) it improves the general controllability of the aircraft also during hover conditions in terms of quicker yaw and roll control. This may be used for gust response or during landing operations. In case of low to mid speed maneuvering, the main lifting rotors may be exposed to less torque/power consumption due to assistance by the coaxial pushers, which may lead to less overpower demand which enables to use lighter lifting motors.

It will be easily acknowledged by the skilled person that the present invention is not limited to only two pushers. In case of a design with one or multiple (more than two) pushing units with dual stage rotors, the inventive method can also be applied successfully.

The invention claimed is:

1. A method of controlling a multi-rotor aircraft (1), said aircraft (1) comprising:
    at least four lifting rotors (2; R1-R6), each having a first rotation axis which is essentially parallel to a yaw axis (z) of the aircraft (1), and at least two forward propulsion devices (3), each of the at least two forward propulsion devices having at least two counterrotating rotors (P1_R1, P1_R2, P2_R1, P2_R2) that are arranged coaxially with a second rotation axis which is essentially parallel to a roll axis (x) of the aircraft, each of the at least two forward propulsion devices (3, P1, P2) being arranged symmetrically about the roll axis at a respective distance (+y, −y) from said roll axis (x), the method comprising:
    using at least one of the rotors (P1_R1, P1_R2, P2_R1, P2_R2) of the at least two forward propulsion devices (3, P1, P2) to control a moment of the aircraft about at least one of the yaw axis (z) or the roll axis (x) independently from each other.

2. The method of claim 1, further comprising determining an unbalanced moment about at least one of the yaw axis (z) or the roll axis (x); using at least one of the rotors (P1_R1, P1_R2, P2_R1, P2_R2) of the at least two forward propulsion devices (3, P1, P2) to compensate said unbalanced moment around the yaw axis (z) or the roll axis (x).

3. The method of claim 2, wherein the using of at least one of the rotors (P1_R1, P1_R2, P2_R1, P2_R2) of the at least two forward propulsion devices (3, P1, P2) to compensate said unbalanced moment around the yaw axis (z) or the roll axis (x) is carried out upon failure of any one of the lifting rotors (2; R1-R6).

4. The method of claim 1, further comprising, in case of a failure of any one of the lifting rotors (2; R1-R6), operating all remaining functional ones of the lifting rotors (R2-R6) with adapted respective rotor speeds.

5. The method of claim 1, further comprising:
    in case of an unbalanced moment about the yaw axis (z), operating the at least two counterrotating rotors (P1_R1, P1_R2, P2_R1, P2_R2) of the at least two forward propulsion devices (3; P1, P2) in mutually opposite directions of rotation to generate, with said at least two counterrotating rotors (P1_R1, P1_R2, P2_R1, P2_R2), a combined thrust force (Fx) in a direction parallel to the roll axis (x) for a given forward propulsion device (3; P1, P2), wherein a moment about the yaw (z) axis created by said combined thrust force (Fx) is essentially equal in magnitude but opposite in direction to a determined unbalanced moment about the yaw axis (z).

6. The method of claim 5, wherein said combined thrust force (Fx) for one said forward propulsion device of the at least two forward propulsion devices (3; P1, P2) is opposite in direction when compared to the combined thrust force (Fx) of another said forward propulsion device of the at least two forward propulsion devices (3; P1, P2), and a combined moment about the yaw axis (z) created by said combined thrust forces is essentially equal in magnitude but opposite in direction to the determined unbalanced moment about the yaw axis (z).

7. The method of claim 5, wherein, there are two of the forward propulsion devices (3; P1, P2) that are located at a same distance (+/−y) from the roll axis (x), and the combined thrust forces of the forward propulsion devices (3; P1, P2) are equal in magnitude.

8. The method of claim 1, further comprising:
    in case of an unbalanced moment about the roll axis (x), operating at least one of the rotors (P1_R1, P1_R2, P2_R1, P2_R2) of the at least two forward propulsion devices (3; P1, P2) such that a combined moment about the roll axis (x) generated by said operated rotor(s) (P1_R1, P1_R2, P2_R1, P2_R2) of the at least two forward propulsion device(s) (3; P1, P2) is essentially equal in magnitude but opposite in direction to a determined unbalanced moment about the roll axis (x).

9. The method of claim 8, wherein at least one of the rotors (P1_R1, P1_R2, P2_R1, P2_R2) of each said forward propulsion device (3; P1, P2) is operated.

10. The method of claim 8, wherein in case of an unbalanced moment about the yaw axis (z):
    i) for each said forward propulsion device (3; P1, P2), operating the rotors (P1_R1, P1_R2, P2_R1, P2_R2) such that they do not produce, in combination, any moment about the roll axis (x); or
    ii) for multiple ones of the forward propulsion devices (3; P1, P2), the rotors (P1_R1, P1_R2, P2_R1, P2_R2) are operated such that any moments about the roll axis (x) created by the multiple ones of the forward propulsion devices (3; P1, P2) are compensated between the multiple ones of the forward propulsion devices (3; P1, P2).

11. The method of claim 1, further comprising, in case of an unbalanced moment about the yaw axis (z), generating, for each said forward propulsion device (3; P1, P2) in a multitude of forward propulsion devices, a respective moment about the yaw axis (z), with said moments being essentially equal in magnitude but of opposite direction.

12. The method of claim 1, wherein in case of an unbalanced moment about the roll axis (x) during operating only one said rotor (P1_R1, P1_R2, P2_R1, P2_R2) per each said forward propulsion device from a multitude of two forward propulsion devices (3; P1, P2), a direction of rotation is the same for the rotors (P1_R1, P1_R2, P2_R1, P2_R2) of both said forward propulsion devices (3; P1, P2).

13. The method of claim 1, wherein in case of an unbalanced moment about the roll axis (x) during operating the at least two counterrotating rotors (P1_R1, P1_R2, P2_R1, P2_R2) for a given said forward propulsion device (3; P1, P2), the at least two counterrotating rotors (P1_R1, P1_R2, P2_R1, P2_R2) are operated in differential mode, producing a residual moment about the roll axis (x).

14. The method of claim 1, wherein in case of an unbalanced moment about the roll axis (x), operating at least one said rotor (P1_R1, P1_R2, P2_R1, P2_R2) of each said forward propulsion device (3; P1, P2) from a multitude of two forward propulsion devices (3; P1, P2) to generate, with each said forward propulsion device (3; P1, P2), a thrust force of each said forward propulsion device (3; P1, P2) in a direction parallel to the roll axis (x), wherein said thrust force of one said forward propulsion device (3; P1, P2) is oriented in a same direction when compared to the thrust force of the other forward propulsion device (3; P1, P2).

15. The method of claim 14, wherein said thrust force of said one forward propulsion device (3; P1, P2) is equal in magnitude when compared to the thrust force of the other forward propulsion device (3; P1, P2).

16. A multi-rotor aircraft (1), said aircraft (1) comprising:
at least four lifting rotors (2; R1-R6), each having a first rotation axis which is essentially parallel to a yaw axis (z) of the aircraft (1);
at least two forward propulsion devices (3; P1, P2), each of the at least two forward propulsion devices (3; P1, P2) having at least two counterrotating rotors (P1_R1, P1_R2, P2_R1, P2_R2) that are arranged coaxially with a second rotation axis which is essentially parallel to a roll axis (x) of the aircraft (1), each of the at least two forward propulsion devices (3; P1, P2) being arranged symmetrically about the roll axis at a respective distance (+y, −y) from said roll axis (x);
a flight controller (5) in operative connection with said lifting rotors (2; R1-R6) and said at least two forward propulsion devices (3; P1, P2), said flight controller (5) is configured to control said lifting rotors (2; R1-R6) and said at least two forward propulsion devices (3; P1, P2) to compensate any unbalanced moment around the yaw axis (z) or the roll axis (x) by: controlling at least one of the rotors (P1_R1, P1_R2, P2_R1, P2_R2) of the at least two forward propulsion devices (3; P1, P2) to control a moment of the aircraft about at least one of the yaw axis (z) or the roll axis (x) independently from each other.

17. The multi-rotor aircraft (1) of claim 16, wherein the flight controller (5) is configured to compensate the unbalanced moment around the yaw axis (z) or the roll axis (x) in case of a failure of any one of the lifting rotors (R1-R6).

18. The aircraft (1) of claim 16, wherein the flight controller (5) is further configured to perform the method steps of:
determining an unbalanced moment about at least one of the yaw axis (z) or the roll axis (x); and using at least one of the rotors (P1_R1, P1_R2, P2_R1, P2_R2) of the at least two forward propulsion devices (3, P1, P2) to compensate said unbalanced moment around the yaw axis (z) or the roll axis (x).

19. The aircraft (1) of claim 16, wherein the flight controller (5) is further configured to perform the method steps of:
in case of a failure of any one of the lifting rotors (2; R1-R6), operating all remaining functional ones of the lifting rotors (R2-R6) with adapted respective rotor speeds.

20. The aircraft (1) of claim 16, wherein the flight controller (5) is further configured to perform the method steps of:
in case of an unbalanced moment about the yaw axis (z), operating the at least two counterrotating rotors (P1_R1, P1_R2, P2_R1, P2_R2) of the at least two forward propulsion devices (3; P1, P2) in mutually opposite directions of rotation to generate, with said at least two counterrotating rotors (P1_R1, P1_R2, P2_R1, P2_R2), a combined thrust force (Fx) in a direction parallel to the roll axis (x) for a given forward propulsion device (3; P1, P2), wherein a moment about the yaw (z) axis created by said combined thrust force (Fx) is essentially equal in magnitude but opposite in direction to a determined unbalanced moment about the yaw axis (z).

* * * * *